(12) United States Patent
Chen et al.

(10) Patent No.: US 8,922,525 B2
(45) Date of Patent: Dec. 30, 2014

(54) TOUCH-CONTROLLED ELECTRONIC DEVICE AND METHOD FOR REDUCING WIRELESS SIGNAL INTERFERENCE TO TOUCH SENSING FUNCTION

(75) Inventors: Tsan-Yuan Chen, Taoyuan County (TW); Tsung-Pao Kuan, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 239 days.

(21) Appl. No.: 13/423,639

(22) Filed: Mar. 19, 2012

(65) Prior Publication Data

US 2013/0241864 A1 Sep. 19, 2013

(51) Int. Cl.
*G06F 3/044* (2006.01)

(52) U.S. Cl.
USPC .......................................................... 345/174

(58) Field of Classification Search
CPC ...... G06F 3/0416; G06F 3/044; G06F 3/0488
USPC ................................................. 345/173–176
See application file for complete search history.

(56) References Cited

U.S. PATENT DOCUMENTS

| 2008/0162996 | A1 | 7/2008 | Krah et al. | |
|---|---|---|---|---|
| 2008/0165157 | A1* | 7/2008 | Fu et al. | 345/174 |
| 2010/0141683 | A1* | 6/2010 | van der Meulen | 345/660 |
| 2011/0148813 | A1 | 6/2011 | Araki | |
| 2011/0248937 | A1 | 10/2011 | Suzuki | |
| 2012/0050225 | A1 | 3/2012 | Chou et al. | |

* cited by examiner

*Primary Examiner* — Andrew Sasinowski
(74) *Attorney, Agent, or Firm* — Birch, Stewart, Kolasch & Birch, LLP

(57) ABSTRACT

A touch-controlled electronic device with a wireless communication function and a method for reducing wireless signal interference to a touch sensing function are disclosed. The electronic device includes a wireless communication module, a touch sensing module and a synchronous signal interface. By the synchronous signal interface, a synchronous signal is transmitted between the wireless communication module and the touch sensing module and, accordingly, the transmission of the wireless signal is staggered from the timing that receiver electrodes of the touch sensing module receive sensed signals. Thus, wireless signal interference to the touch sensing function of the touch sensing module is suppressed.

5 Claims, 4 Drawing Sheets

TOUCH-CONTROLLED ELECTRONIC DEVICE AND METHOD FOR REDUCING WIRELESS SIGNAL INTERFERENCE TO TOUCH SENSING FUNCTION

BACKGROUND OF THE INVENTION

1. Field of the Invention

The present invention relates to a touch-controlled electronic device with a wireless communication function, and in particular relates to an electronic device capable of reducing wireless signal interference to touch sensing function.

2. Description of the Related Art

Today, most electronic devices are equipped with touch panels and are generally equipped with built-in wireless communication modules.

However, for a projective capacitive touch panel, the touch sensing function is extremely susceptible to wireless wave interference. In a case where the wireless communication module is a near field communication module (NFC module, built in an electronic device for implementing an E-Ticket, an E-Card, a Radio-Frequency identification device and so on) the Radio-Frequency (RF) waveform emitted from the antenna may considerably affect the touch sensing function of the projective capacitive touch panel when the wireless communication module enters a card reader mode or a peer-to-peer transmission mode.

The technological field is in dire need of developing solutions to cope with wireless signal interference to the touch sensing function.

BRIEF SUMMARY OF THE INVENTION

A touch-controlled electronic device with a wireless communication function and a method of reducing wireless signal interference to a touch sensing function are disclosed.

The disclosed touch-controlled electronic device comprises a wireless communication module, a touch sensing module and a synchronous signal interface.

In an exemplary embodiment, the wireless communication module has an antenna for receiving or transmitting a wireless signal. The touch sensing module is used for sensing a touch of an object. The synchronous signal interface is coupled between the touch sensing module and the wireless communication module for transmitting a synchronous signal. When the wireless communication module receives or transmits the wireless signal, the touch sensing module stops sensing the touch according to the synchronous signal.

In another exemplary embodiment, the touch sensing module is used for sensing a touch of an objective, and the wireless communication module has an antenna for receiving or transmitting a wireless signal. The synchronous signal interface is coupled between the touch sensing module and the wireless communication module for transmitting a synchronous signal. When the touch sensing module senses the touch, the wireless communication module stops receiving or stops transmitting the wireless signal according to the synchronous signal.

The disclosed method for reducing wireless signal interference to the touch sensing function is applied in a touch-controlled electronic device. The touch-controlled electronic device has a wireless communication module and a touch sensing module. The disclosed method comprises the steps as follows: receiving or transmitting a wireless signal by the wireless communication module; transmitting a synchronous signal to the wireless communication module when the touch sensing module senses a touch of an object; and according to the synchronous signal, stopping receiving or transmitting the wireless signal by the wireless communication module.

In another exemplary embodiment, the disclosed method for reducing wireless signal interference to the touch sensing function comprises the steps as follows: sensing a touch of an object by the touch sensing module; transmitting a synchronous signal to the touch sensing module when the wireless communication module transmits or receives a wireless signal; and according to the synchronous signal, stopping sensing the touch by the touch sensing module.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
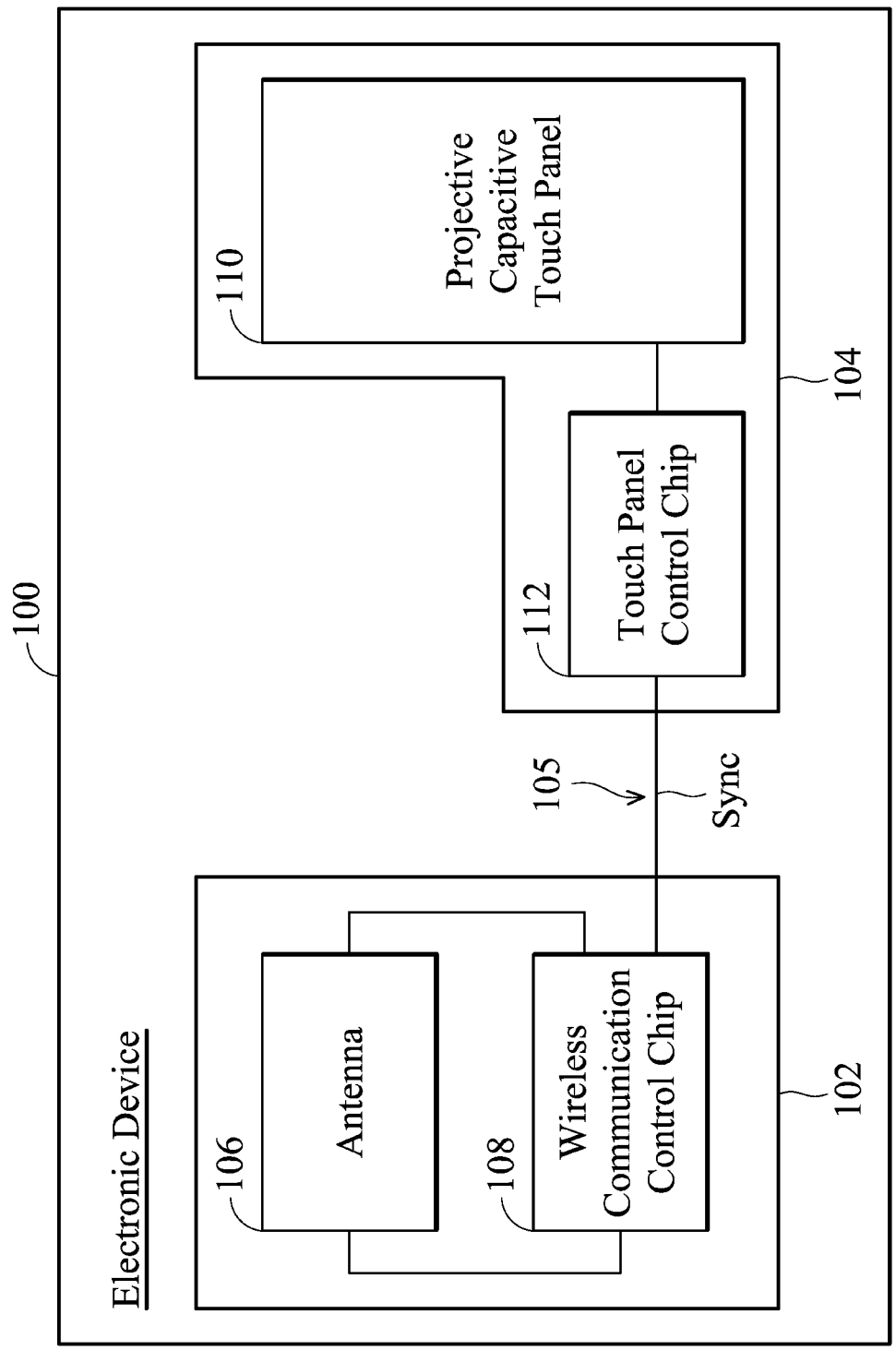
FIG. 1 is a block diagram depicting an electronic device 100 in accordance with an exemplary embodiment of the invention.

FIG. 1 is a block diagram depicting an electronic device 100 in accordance with an exemplary embodiment of the invention. The electronic device 100 comprises a wireless communication module 102, a touch sensing module 104 and at least one synchronous signal interface 105 electrically coupled between the wireless communication module 102 and the touch sensing module 104. The wireless communication module 102 may have an antenna 106 for receiving or transmitting a wireless signal. The touch sensing module 104 may be used for sensing a touch of an object. By the synchronous signal interface 105, a synchronous signal sync is transmitted between the wireless communication module 102 and the touch sensing module 104, to prevent the touch sensing function of the touch sensing module 104 from being affected by the wireless signal output from the wireless communication module 102.

As shown in FIG. 1, in an exemplary embodiment, the wireless communication module 102 comprises an antenna 106 and a wireless communication control chip 108. According to an exemplary embodiment, the wireless communication control chip 108 may provide a general purpose input/output pin GPIO to work as a synchronous transmission terminal of the synchronous signal interface 105 for outputting the synchronous signal sync to the touch sensing module 104. In other exemplary embodiments, the synchronous signal sync may be generated by the touch sensing module 104 and provided to the wireless communication control chip 108, and the wireless communication control chip 108 may provide a general purpose input/output pin to receive the synchronous signal sync. In other exemplary embodiments, the wireless communication control chip 108 may further contain an additional pin for transmitting/receiving the synchronous signal sync.

Further, the touch sensing module 104 comprises a projective capacitive touch panel 110 and a touch panel control chip 112. In another exemplary embodiment, the touch panel control chip 112 may provide a general purpose input/output pin to work as a synchronous transmission terminal for outputting the synchronous signal sync to the wireless communication module 102. In other exemplary embodiments, the synchronous signal sync may be generated by the wireless communication module 102 and the touch panel control chip 112 may provide a general purpose input/output pin to receive the synchronous signal sync. In other exemplary embodiments, the touch panel control chip 112 may further contain an additional pin for transmitting/receiving the synchronous signal sync.

Figure 2A:
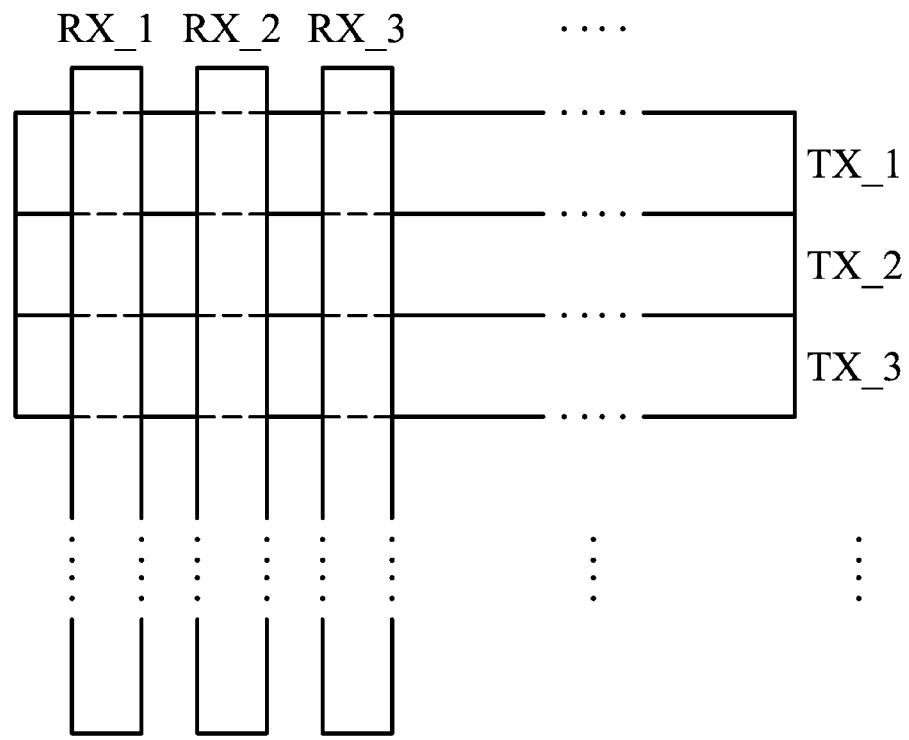
FIG. 2A and FIG. 2B illustrate the operations of a projective capacitive touch panel 110.
Figure 2B:
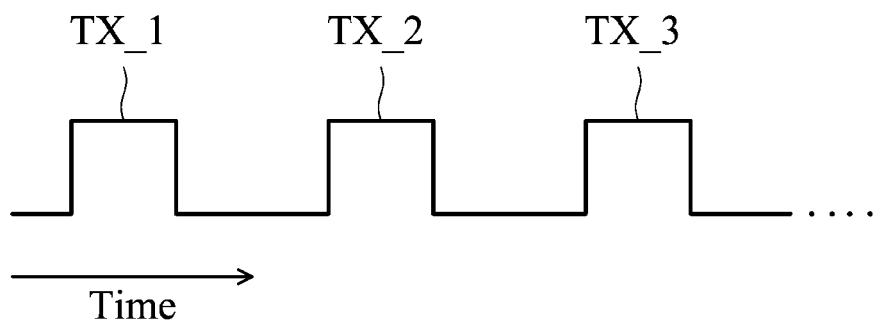

FIG. 2A and FIG. 2B illustrate the operations of a projective capacitive touch panel 110. As shown in FIG. 2A, the projective capacitive touch panel has transmitter electrodes TX_1, TX_2, TX_3 . . . and receiver electrodes RX_1, RX_2, RX_3 . . . deployed thereon. FIG. 2B illustrates the signal timing of the transmitter electrodes TX_1, TX_2, TX_3 . . . . The transmitter electrodes TX_1, TX_2, TX_3 . . . provide scanning signals at different times and, accordingly, the receiver electrodes RX_1, RX_2, RX_3 . . . receive sensing signals from the areas corresponding to the transmitter electrodes. For example, when a scanning signal is provided at the transmitter electrode TX_1, sensing signals received by the receiver electrodes RX_1, RX_2, RX_3 . . . are sensed from the area corresponding to the transmitter electrode TX_1; when a scanning signal is provided at the transmitter electrode TX_2, sensing signals received by the receiver electrodes RX_1, RX_2, RX_3 . . . are sensed from the area corresponding to the transmitter electrode TX_2; and when a scanning signal is provided at the transmitter electrode TX_3, sensing signals received by the receiver electrodes RX_1, RX_2, RX_3 . . . are sensed from the area corresponding to the transmitter electrode TX_3. To prevent the sensing signals received by the receiver electrodes of the projective capacitive touch panel 110 from being affected by the wireless signal from the antenna 106, one solution disclosed in the disclosure is to stagger, in accordance with the synchronous signal sync, the timing of transmitting the wireless signal and the timing that the receiver electrodes receive the sensing signals. Alternatively, according to the synchronization signal sync, the sensing signals received by the receiver electrodes may further proceed with compensation operation so as to take the wireless signal interference into consideration, if necessary.

An example that uses the wireless communication module 102 to provide the synchronous signal sync is discussed below. When the antenna 106 of the wireless communication module 102 emits a wireless signal, the synchronous signal sync may be generated by the wireless communication control chip 108 and may be an enable level, which indicates the interval for which the antenna 106 is emitting the wireless signal. The enable level may be a high voltage logic level (e.g. 5V) or a low voltage logic level (e.g. 0V). For example, when the wireless communication module 102 receives or transmits a wireless signal, the wireless communication module 102 may generate the synchronous signal sync to be transmitted to the touch sensing module 104 through the synchronous signal interface 105. When detecting or receiving the synchronous signal sync, the touch sensing module 104 may stop sensing a touch accordingly to perform an anti-interference operation. In an exemplary embodiment, the scanning timing (the timing that the transmitter electrodes TX_1, TX_2, TX_3 . . . generate the scanning signals) of the projective capacitive touch panel 110 is adjusted by the touch panel control chip 112, so that the scanning timing of the touch panel is staggered from the wireless communication intervals of the wireless communication module 102. In this manner, when the wireless communication module 102 receives or transmits a wireless signal, the touch sensing module 104 may stop sensing a touch according to the synchronous signal sync. In another exemplary embodiment, the touch panel control chip 112 may make wireless interference compensation to the sensing signals received by the receiver electrodes RX_1, RX_2, RX_3 . . . of the projective capacitive touch panel 110, such that the interference, caused by the wireless communication module 102, to the touch sensing function could be reduced.

An example that uses the touch sensing module 104 to provide the synchronous signal sync is discussed below. When the receiver electrodes of the projective capacitive touch panel 110 of the touch sensing module 104 receive sensing signals, the touch panel control chip 112 may generate the synchronous signal sync, which may be an enable level. The enable level may be a high voltage logic level (e.g. 5V) or a low voltage logic level (e.g. 0V). In this manner, the synchronous signal sync indicates the intervals that the receiver electrodes of the projective capacitive touch panel 110 receive sensing signals. According to the synchronous signal sync, the wireless communication module 102 stops receiving or transmitting the wireless signal so that the transmission of the wireless signal is staggered from the timing of sensing a touch. In this manner, when the touch sensing module 104 senses a touch, the wireless communication module 102 may stop receiving or transmitting the wireless signal according to the synchronous signal sync.

The wireless communication module 102 may be implemented in different Means—for example, a near field communication module (NFC module), a Bluetooth module, a WiFi module, or a frequency modulation module and so on. Any module built in an electronic device for emitting a wireless signal by an antenna may be used to implement the wireless communication module 102 of the disclosure.

In this paragraph, an exemplary embodiment which uses a near field communication module to implement the wireless communication module 102 is shown. For general operations, the near field communication module may be switched among a card mode, a reader mode and a standby mode. In the reader mode, the antenna 106 may emit a radio frequency wave to detect the surrounding area to search for a card. In another case, the near field communication module may be switched to a peer-to-peer transmission mode to communicate with another electronic device which contains a near field communication mode as well, and thereby a peer-to-peer communication is established. In the peer-to-peer communication mode, the antenna 106 emits a radio frequency wave to communicate with a near field communication module equipped on another electronic device. In a case wherein the synchronous signal sync is provided from the wireless communication module 102, the wireless communication module 102 generates the synchronous signal sync (e.g. an enable level) in the reader mode and the peer-to-peer mode. In a case wherein the synchronous signal sync is generated from the touch sensing module 104, the reader mode and the peer-to-peer mode of the wireless communication module 102 are permitted only when the synchronous signal interface does not transmit the synchronous signal sync (i.e., when the synchronous signal sync is not received by the wireless communication module 102.)

In an exemplary embodiment, the disclosed electronic device may be a smart phone. The wireless communication module may be a near field communication device. The touch sensing module may be implemented in accordance with a projective capacitive touch sensing technique. The antenna 106 of the near field communication device may be circled around the peripheral of the projective capacitive touch panel 110, which seriously affects the touch sensing function. By the technique of the disclosure, the interference caused by the radio frequency signal emitted from the antenna 106 of the near field communication device may be effectively reduced.

In an exemplary embodiment, the generation of the synchronous signal sync (e.g. an enable level) may be implemented by an interrupt procedure.

Figure 3A:
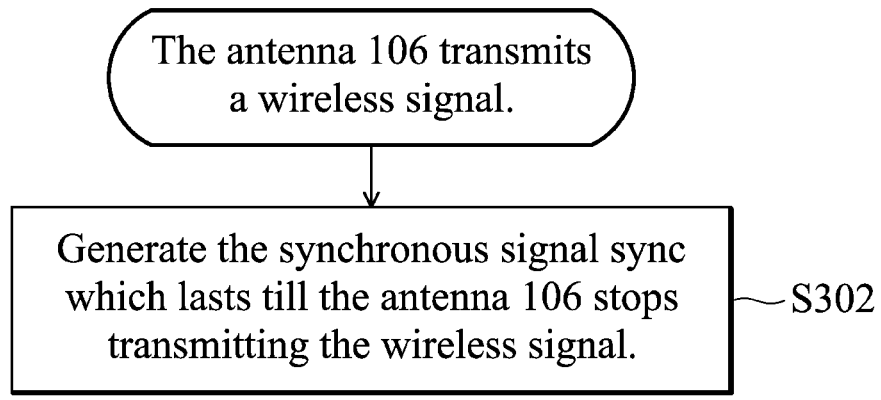
FIG. 3A and FIG. 3B show a flowchart depicting an example in which the synchronous signal sync is provided from the wireless communication module 102.
Figure 3B:
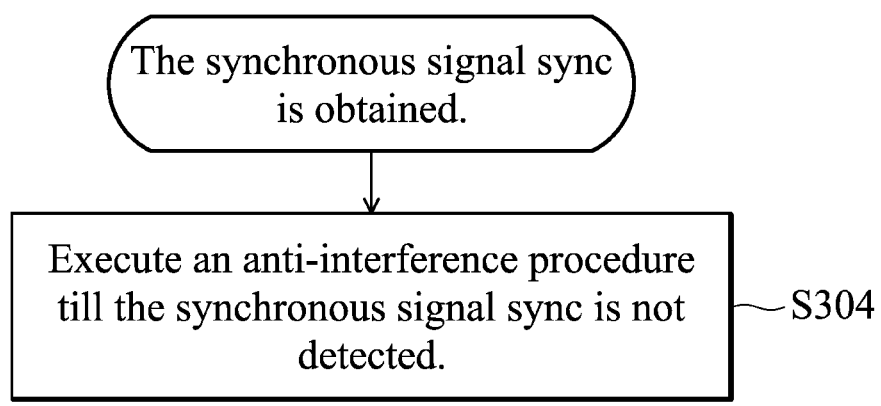

FIG. 3A depicts an example in which the synchronous signal sync is provided from the wireless communication module 102. When the antenna 106 emits a wireless signal (i.e. a communication signal,) the step S302 is performed by the wireless communication control chip 108 to generate the synchronous signal sync (e.g. an enable level), which lasts till the antenna 106 stops emitting the wireless signal. Correspondingly, FIG. 3B shows the operations of the touch sensing module 104. When detecting the synchronous signal sync (e.g. the enable level), the step S304 is performed by the touch sensing chip 112 to execute an anti-interference operation till the synchronous signal sync is not detected. In the above method, the anti-interference operation can be achieved by mean of stopping the touch sensing function by the touch sensing chip 112.

Figure 4A:
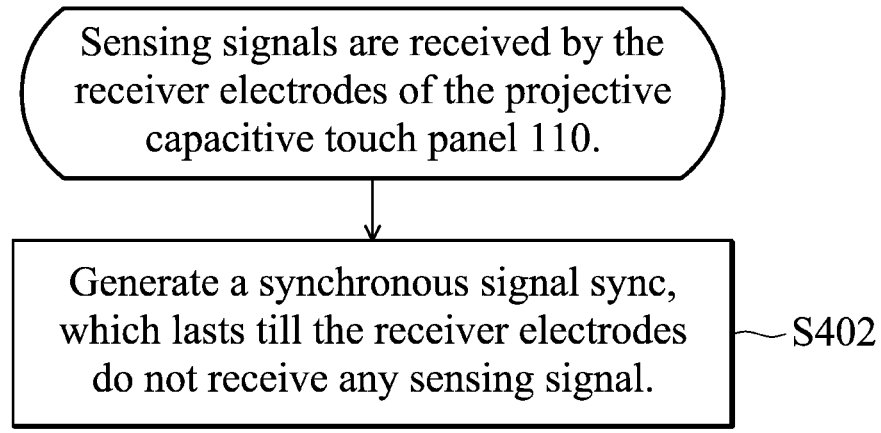
FIG. 4A and FIG. 4B show a flowchart depicting an example in which the synchronous signal sync is provided from the touch sensing module 104.
Figure 4B:
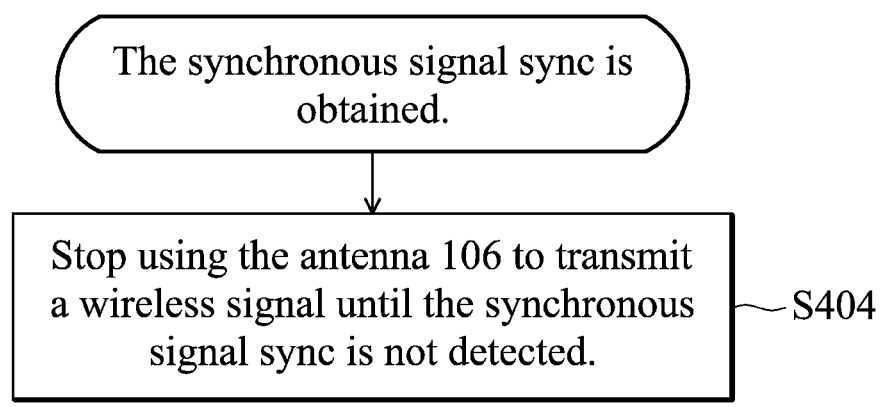

FIG. 4A depicts an example in which the synchronous signal sync is provided from the touch sensing module 104. When the receiver electrodes of the projective capacitive touch panel 110 receive sensing signals, the step S402 is performed by the touch sensing chip 112 to generate a synchronous signal sync (e.g. an enable level), which lasts till the receiver electrodes do not receive any sensing signal. Correspondingly, FIG. 4B shows the operations of the wireless communication module 102. When detecting the synchronous signal sync (e.g. at the enable level,) the step S404 is performed by the wireless communication control chip 108 to stop using the antenna 106 to emit a wireless signal until the synchronous signal sync is not detected.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch-controlled electronic device, comprising:
    a touch sensing module, for sensing a touch of an object and generating a synchronous signal when sensing the touch, wherein the touch sensing module has a capacitive touch panel and a touch panel control chip;
    a near field communication device, having an antenna for receiving or transmitting a wireless signal, wherein the antenna of the near field communication device is circled around the capacitive touch panel; and
    a synchronous signal interface, coupled between the touch sensing module and the near field communication device for transmitting the synchronous signal, wherein when the touch sensing module senses the touch, the touch sensing module is adapted to transmit the synchronous signal to the near field communication device through the synchronous signal interface and the near field communication device stops receiving or transmitting the wireless signal according to the synchronous signal.

2. The touch-controlled electronic device as claimed in claim 1, wherein the near field communication device contains a wireless communication control chip, and the synchronous signal interface is coupled between the touch panel control chip and the wireless communication control chip.

3. The touch-controlled electronic device as claimed in claim 2, wherein the touch panel control chip and the wireless communication control chip each provide at least one general purpose input/output pin electrically connected to each other to form the synchronous signal interface.

4. The touch-controlled electronic device as claimed in claim 1, wherein the near field communication device is adapted to enter a reader mode or a peer-peer mode when the synchronous signal is not transmitted by the synchronous signal interface.

5. A method for reducing wireless signal interference to a touch sensing function in a touch-controlled electronic device, wherein the touch-controlled electronic device has a near field communication device and a touch sensing module, the method comprising:
    receiving or transmitting a wireless signal by the near field communication device;
    transmitting a synchronous signal by the touch sensing module to the near field communication device when the touch sensing module senses a touch of an object; and
    stopping receiving or transmitting the wireless signal by the near field communication device according to the synchronous signal.

* * * * *